United States Patent [19]

Kunze et al.

[11] 4,361,722
[45] Nov. 30, 1982

[54] SLEEVE HEAD FOR CLOSING THE ENDS OF A CABLE SLEEVE

[75] Inventors: Dieter Kunze, Neuried; Josef Bauer, Germering, both of Fed. Rep. of Germany

[73] Assignee: Siemens Aktiengesellschaft, Berlin & Munich, Fed. Rep. of Germany

[21] Appl. No.: 231,437

[22] Filed: Feb. 4, 1981

[30] Foreign Application Priority Data

Feb. 28, 1980 [DE] Fed. Rep. of Germany ....... 3007604

[51] Int. Cl.³ ............................................. H02G 15/18
[52] U.S. Cl. ................................ 174/93; 174/DIG. 8; 264/230; 264/291; 156/86
[58] Field of Search ........................... 174/93, DIG. 8; 264/230, 291, 292, 342 R, DIG. 66, DIG. 71; 428/36; 156/86; 403/273; 29/447, DIG. 35

[56] References Cited

U.S. PATENT DOCUMENTS 4,203,000 5/1980 Muller ............................... 174/93 X

*Primary Examiner*—A. T. Grimley
*Assistant Examiner*—D. A. Tone
*Attorney, Agent, or Firm*—Hill, Van Santen, Steadman, Chiara & Simpson

[57] ABSTRACT

A sleeve head for closing an end of a cable sleeve, which sleeve head being a one piece member of a shrinkable material having a transverse wall with an integral outer wall portion and having at least one flange surrounding an opening so that a cable can be sealingly received in the head by shrinking the flange from an expanded state towards a normal state into sealing engagement on the cable, characterized by each of the flanges in the expanded state being expanded only in a radial direction and having substantially no deformation and stresses along the axial direction of the opening and the transverse wall adjacent each of the expanded flanges being folded outwardly to compensate for the expansion of the size of the flange so that during heat shrinking the flange shrinks radially inward onto a cable disposed therein with a folded wall moving to a substantial transverse planar condition without any axial shrinkage of the flange to create disruptions in the seals. If the flange has a sealing joint which includes an axial slot of the flange extending through a portion of the transverse wall and the adjacent wall portion, the flange in the expanded state has a non-uniform expansion so that the flange adjacent the slot has substantially no expansion so that during subsequent shrinking no contraction occurs adjacent the slots to cause a disruption in the sealing joint. Different methods can be utilized for expanding the flange without causing axial deformation.

14 Claims, 5 Drawing Figures

SLEEVE HEAD FOR CLOSING THE ENDS OF A CABLE SLEEVE

BACKGROUND OF THE INVENTION

The present invention is directed to a sleeve head consisting of a single member of shrinkable material for closing the end of a cable sleeve. The sleeve head has a flanged opening in a wall to form a sealable cable inlet for allowing insertion of the cable into the cable sleeve.

Cable sleeves, which are sealed by a sleeve head having a flanged opening which is shrinkable into sealing engagement onto a cable inserted into the cable sleeve, are disclosed in U.S. Pat. No. 4,203,000, which was based on German patent application No. 27 31 578. The patent discloses a cable sleeve, which has a divided metal supporting jacket, which is closed on both ends by sleeve heads which consist of a member of thermally shrinkable material. Each of the sleeve heads has a planar wall with an integral cylindrical outer wall portion or flange and at least one flanged opening for forming a cable inlet. Each of the flanged openings is provided with a sealable separating joint formed by an axial slot in the flange which extends through a portion of the wall between the outer wall portion and the flange and also the outer wall portion to enable inserting of an uncut cable into the flanged opening of the sleeve head without threading an end of the cable through the opening. In the region of the separating joint, a web extends between each edge of the slot of the flanged opening to the outer wall portion and these webs are engaged by a support ring. After insertion of the cable, the flanged openings are shrunk onto the inserted cable by a heat shrinking process. Since, in the case of a uniform shrinking, the area of the separating joint also must be shrunk, irregularities can result in the region of the separating joint. These irregularities, which occur particularly during the shrinking of the flange into sealing engagement on a cable having a small diameter, lead to formations of unsealed locations in the contact or the support areas of the joint. This is due to the consequence of the shrinking forces acting uniformly in the circumferential direction which attempts to draw apart the separation joint. In this manner, a gap will develop along a surface line extending in the axial direction of the cable and the separation joint which gaps leads to a breaking of the seal. The gusset regions along the separating joint are particularly endangered by such a gap.

Additional problems also occur from the expansion process used prior to the shrinking step. Each of the cable inlets formed by the flange openings are expanded by means of pressing a conically designed punch or mandrel therethrough. However as a result of this, axial displacements and deformations result due to the frictional forces which occur between the flange opening and the mandrel. These axial displacements or deformations will result in axial stresses, which are relieved during the shrinking process and cause axial displacement to therefore create problems with sealing engagement.

SUMMARY OF THE INVENTION

The present invention is directed to providing a sleeve head of a shrinkable material which has a flanged opening through a wall for receiving a cable and which flanged opening is shrinkable onto the cable to form a sealing engagement. The invention is particularly directed to providing a sleeve head which has a flange with an opening and having a separating joint extending axially along the flange which enables inserting the cable into the flange and which joint is not subjected to problems with leaks occurring during the shrinking process. In particular, the design of the sleeve heads prevents axial displacement from occurring during the shrinking process as a consequence of the shrinking forces.

To accomplish these tasks, the present invention is directed to an improvement in a sleeve head for closing an end of a cable sleeve, said sleeve head being a one piece member of a shrinkable material as crosslinked polyethylene having a transverse wall with an integral outer wall portion and having at least one integral flange having an opening, each of said flanges forming cable inlet means for sealingly receiving a cable extending into the cable sleeve by shrinking from an expanded state towards a normal state and into sealing engagement on a cable inserted therein. The improvement comprises each of said flanges in the expanded state being expanded only in a radial direction and having substantially no deformation and stresses along the axial direction of the opening, and said wall adjacent each of the expanded portion of said flanges being folded outward to compensate for the expansion and increased size of said flanges so that during the heat shrinking each flange shrinks radially inward on a cable disposed therein with the wall moving to a substantially transverse planar condition without any axial shrinkage of the flanges to create disruptions in the seals.

In order to be able to fabricate a sleeve head of this type with the cited features the invention is also directed to a corresponding method. In accordance with the present invention, the method for manufacturing a sleeve head in preparation for shrinking of the expanded flange on to a cable expands each flange to the expanded state by using a radially acting spreading apart of the flange opening without any axial displacement or stresses being created in the material of the sleeve head.

In the case of presently known sleeve heads, which have a uniform expansion and axial displacement which occurs from the manufacturing process, there again results during the shrinking operation an axial displacement and an influencing of the sealing engagement particularly in the area of a separating joint, if present. In the prior known methods, the expansion of each of the flanged openings was achieved by means of insertion of a conical punch or mandrel into the cable inlet opening of the flange under pressure while the front face or the wall of the sleeve heads were kept warm. However, this old method creates flanged openings which due to the axial directed deformation forces has or exhibits a non-uniform border at the opposite end which did not run at a right angle to the axis of the opening. These borders were then subsequently cut on a plane extending perpendicular to the axis, and, as a consequence during the shrinking onto the cable, the flanged openings are drawn obliquely towards the interior. This problem was increased in the case of smaller cable diameters. However, this would increase the sealing problems particularly when a separating joint was provided by the slot in the flanged opening.

It was thus an important feature of the method of the present invention to eliminate these deficiencies by means of a suitable improved fabrication method which involved a process or method which did not allow axially acting shrinking forces to occur because the deformation of each of the flanged openings was virtually only in a radial direction. This is accomplished by means, which coact with the punch, to prevent axial displacement and stresses while expanding each of the flanged openings. However, in this case of the expanding operation, a folding out or bulging of the wall due to the expansion of the flange opening does occur. If necessary, each of the flange openings forming the cable inlet means will shrink together in a radial direction, which, in contrast to the previous known sleeve heads, does not have any axial displacement of the flange of each inlet means. This has an additional particular advantage that the shrinking force will act exclusively in a radial direction on each of the cables being disposed in the cable sleeve. Only the fold out wall of the member is re-formed during the shrinking operation and thus this re-formation is dependent upon the degree of shrinkage and thus upon the diameter of the inserted cable.

A particular advantage of the invention is that the expansion method can also be modified when the cable inlet means has a separating joint which is formed by an axial slot in the flange. This modification is by controlling the expansion of the flange so that in the region of the separating joint, no expansion occurs so that during a shrinking operation this portion at the joint remains unchanged. The sealing system or engagement of the enclosures will thus also remain unchanged during the subsequent shrinking operation. These features are achieved by virtue of the fact that each of the flanged openings of the sleeve head are expanded or stretched respectively only on one side namely that side which is opposite the separation joint so that no expansion occurs immediately adjacent the separation joint and that expansion increases gradually as the annular distance from the joint increases. This non-uniform expansion of the flanged opening results in a greater expansion of each of the flanged openings on the side opposite the separating joint. Thus, during the shrinking operation, the majority of the shrinking will occur in the region which is more or less remote from the separating joint without encumbering the separating joint. Therefore, the sealing surfaces of the separating joint between the flanged opening, the exterior wall portion of the sleeve head and the portion of the wall extending between the flange and the outer wall portion will not undergo changes which will cause unsealing during the shrinking operation. Moreover, it is additionally advantageous that in addition to the cited effect, also axial displacement of the surface elements of the flanged opening does not take place.

DESCRIPTION OF THE PREFERRED EMBODIMENTS

Figure 1:
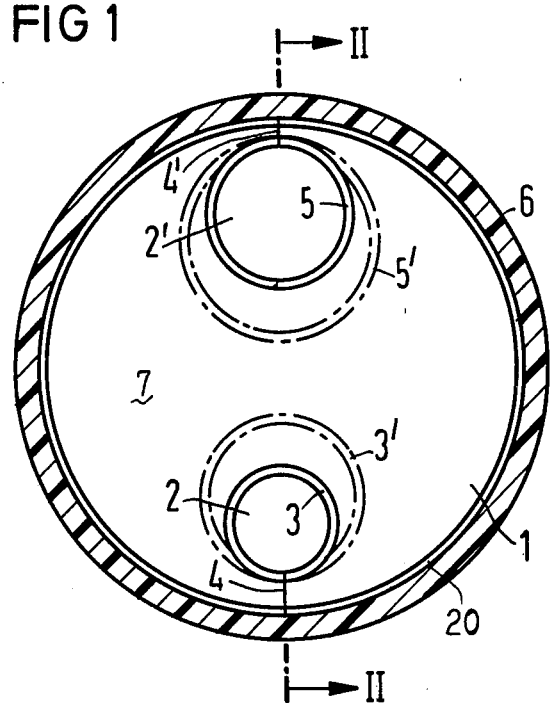
FIG. 1 is an end view taken from line I—I of FIG. 2 of a sleeve head in accordance with the present invention.

The principles of the present invention are particularly useful in a sleeve head 1 which is utilized to close an end of the sleeve tube 6 which may be slotted and is part of a cable sleeve.

The sleeve head 1 is a single or one-piece member, which has a transverse wall 7 with an integral outer wall portion 20 which is illustrated as being a cylindrical portion and a pair of integral flanges 3 and 5, which define cable inlet openings with the flange 3 defining an opening 2 and the flange 5 defining an opening 2'. The flange 3 has the smaller opening 2 than the opening 2' and has a sealable separation joint 4, which is formed by a slot that extends along the axis of the flange 3 through a portion of the wall 7 that extends between the flange 3 and the adjacent wall portion 20 and also through the wall portion 20. Thus, an uncut cable or one whose ends are held and cannot be threaded through the opening can be inserted by being pushed through the slot. In a similar manner, the flange 5 with the larger opening 2' has a sealable separation joint 4' which also is formed by a slot extending through a portion of the flange 5, a portion of the transverse wall 7 that extends between the flange 5 and the wall portion 20 and also through the adjacent wall portion 20.

Each of the flanges with their opening such as the flange 3 with the opening 2 has a normal state which is illustrated in bold lines and an expanded state shown in chain lines such as 3' and 5'. In the illustrated embodiment of the sleeve head 1, because of the separating joint for each of the flanges, the expanded state such as 3' and 5' are one sided or non-uniform with substantially no expansion occurring adjacent the respective separating joints 4 and 4' and the maximum amount of expansion occurring directly opposite from the joint. The amount of expansion of the flange to increase the size of the apertures such as 2 increases as the annular distance on the flange 3 from the slot forming the joint 4 increases. Thus, in the region of the separating joint such as 4, no alteration occurs between the expanded state and the shrinking state when the flange is shrunk by heat shrinking back towards the normal state and into engagement on a cable inserted in the opening such as 2.

Figure 2:
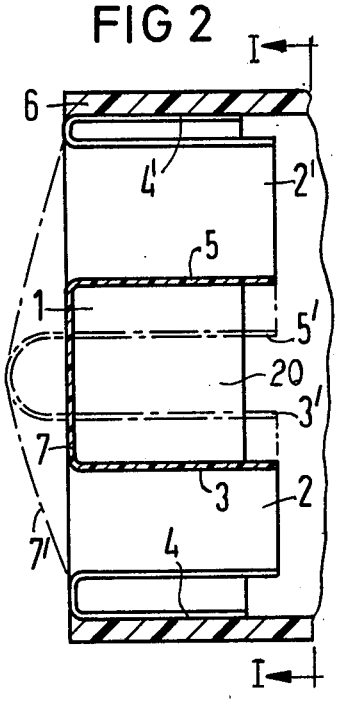
FIG. 2 is an axial section of the sleeve head taken along lines II—II of FIG. 1.

As best illustrated in FIG. 2, to compensate for the increased size of the opening such as 2 and 2' due to the expansion of the flanges 3 and 5 to their expanded state 3' and 5', respectively, the portion of the wall 7 adjacent the expanded portion becomes bulged or folded into a folded configuration 7' to compensate for the decreased area between the expanded flanges 3' and 5'. It is noted that the portion of the wall adjacent the slot forming the joint such as 4 and 4' is not bulged or deformed and thus a shrinking of the flange such as the expanded flange 3' onto a cable inserted therein will not disrupt the joint 4. It is also noted that no surface elements were displaced in an axial direction extending along the axis of the respective openings 2 and 2'. Thus, during a shrinking no axial shrinking or displacement will occur to cause disruptions in the seal either between the flange and the cable or at the sealable separation joint 4 and 4'.

In the embodiment illustrated in FIGS. 1 and 2, the head 1 has each of the flanges such as 3 and 5 provided with a separating joint 4 or 4'. Thus, the radial expansion without any substantial axial deformation or stress is being applied to the head in a non-uniform expansion with substantially no expansion or deformation occurring in the region immediately adjacent to the separating joint and the maximum amount of expansion occurring directly opposite from the joint. In the event that the sleeve head does not have a separating joint for each of the flanges having an opening, then the radial expansion, without any axial deformation or stress is being produced in the head, can be uniformly applied in the radial direction.

Figure 3:
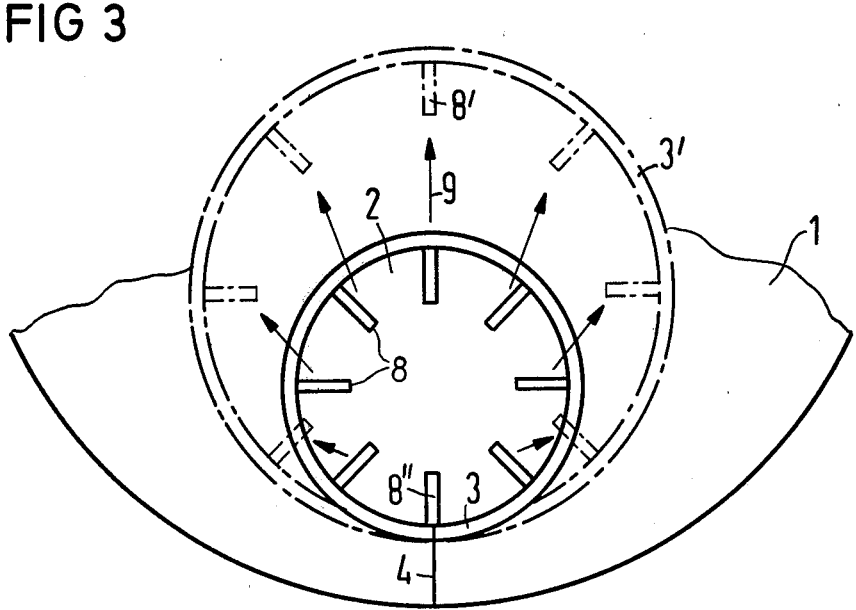
FIG. 3 illustrates one method of radially expanding the flanged opening of the sleeve head in accordance with the present invention.

One embodiment of the method of the present invention for producing a radial expansion of the flanges without any axial stress or axial deformation of the parts of the sleeve head 1 is illustrated in FIG. 3 for expanding the flange 3 which has a separating joint 4, into the expanded state 3' illustrated in broken lines. In order to produce the radial expansion without any axial stresses, a lamellae-system is inserted into the opening 2 and initially uniformly rests against the interior wall of the flange 3. After applying heat so that the material of the flange 7 begins to soften, the lamellae 8 are spread apart in a radial direction from the initial position to an expanded position such as illustrated at 8' in the Figure. Since the flange 3 does have a separating joint 4, the spreading apart of the lamellae 8 to the expanded position 8' is a non-uniform or one sided spreading apart to produce the non-uniform expansion of the flange 3 to the expanded state 3'. This is accomplished by the lamellae 8" which is immediately adjacent the joint 4 being held stationary and each of the other lamellae being moved in the direction of the arrow such as 9 with the greatest movement being accomplished by the lamellae opposite the joint. After the lamellae have moved to the expanded position 8' to produce the desired expanded state 3' for the flange, the head is allowed to cool off so that this form is maintained until a final use. The lamellae are then contracted and removed. Subsequently, after a cable has been inserted in the flange such as 3, and heat is applied for the shrinking operation, the flange will shrink from the expanded state 3' back towards the normal state 3 and into engagement with a cable disposed therein which cable is slightly larger than the normal state with the amount of shrinking being proportional to the amount of previous expansion.

It should be noted, that if the flange did not have a separation joint, then a uniform spreading could be utilized This is accomplished by moving each of the lamellae 8 by a uniform amount in the radial direction.

Figure 4:
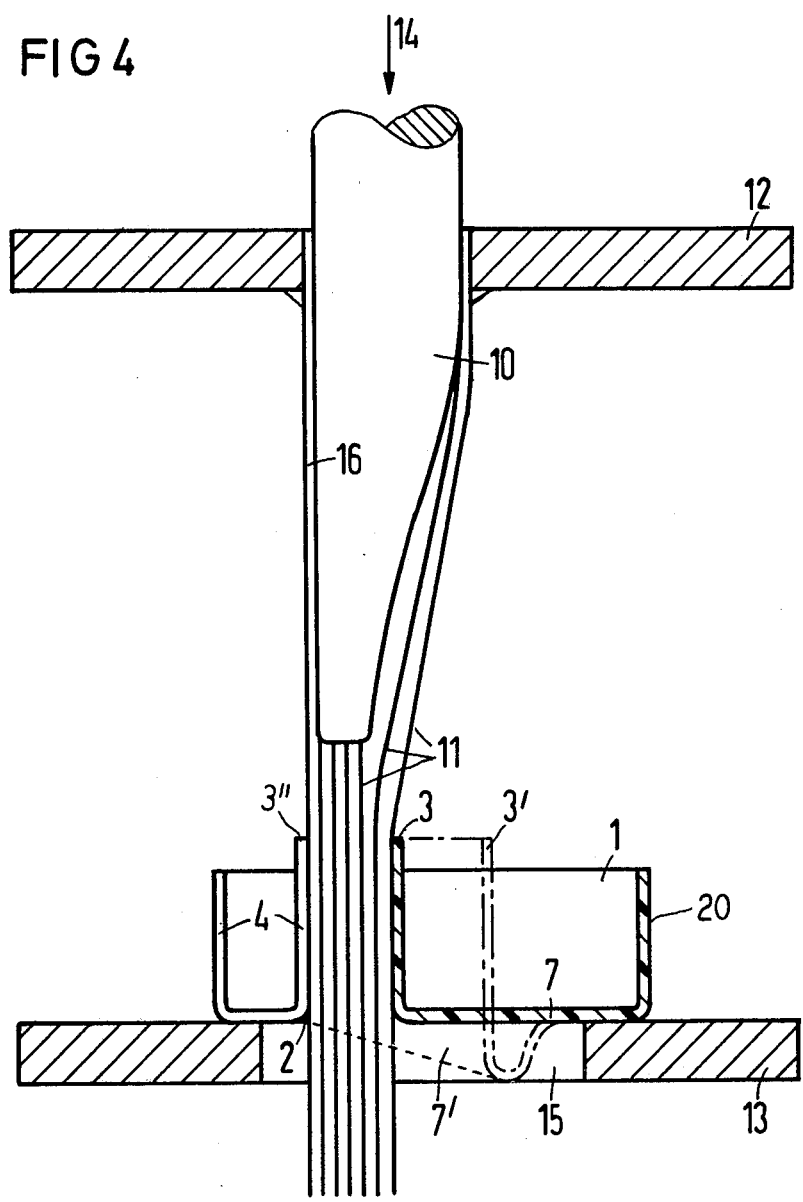
FIG. 4 is a cross-sectional view with portions in elevation for purposes of illustration of another method for expanding the flanged opening of a sleeve head in accordance with the present invention.

In another embodiment of the method for creating a radial expansion of each of the flanges such as 3 to an expanded state 3' without causing axial stresses and/or displacements is illustrated in FIG. 4. In this arrangement, the sleeve head 1 is placed on an abutment or support 13 with a majority of the wall 7 overlying an aperture or opening 15. A conically designed punch 10, which moves in a direction 14, could be then inserted into the opening 2 by being first inserted in a free end 3" of the flange 3. Without any additional structure, eventually an axial displacement of the flange wall 3 would occur as in the prior art methods. In order to prevent the axial displacement for example, an expandable diaphragm can be arranged between the support 13 and the head 1. This expandable diaphragm will be open up in the manner of an iris diaphragm depending upon the penetration depth of the conically extending punch and thus acts as means coacting with the punch to limit the expansion to a radial expansion without any axial stress or displacement.

In the illustrated embodiment of FIG. 4, the means coacting with the punch comprises means 11, which prevents the transfer of frictional forces from the punch to the flange 3 during the insertion of the punch in the opening 2. The means 11 includes an interlayer of guideable thread fibers or the like which are supported on a guide 12 for the punch 10 and extending into the opening 2 of the flange. Suitable fibers for the present purpose are steel fibers.

If the punch 10 is lowered in the direction of the arrow 14, it is now guided by the steel fiber so that a transfer of the frictional forces in the axial direction to the wall of the flange such as 3 cannot take place. In this manner, only the radial deformation takes place to expand the flange 3 to the expanded state 3'. During this expansion, a corresponding portion of the wall 7 is folded or expanded into the folded or buckled condition 7'. Thus, an axial displacement of the material with axial deformation or stresses will not occur.

Since the head 1 has a sealable separating joint 4 for the flange 3, the radial expansion of the flange 3 into the expanded state 3' is one sided or non-uniform expansion. To accomplish this, the punch 10 has a one sided design with the side of the punch adjacent the thread 16 being substantially cylindrical with no expanding characteristic. Thus, the thread 16, which is adjacent the joint 4 will remain substantially parallel to the axis of the flange 3 during the insertion of the punch while the remaining threads of the means 11 will assume a curved or bent shape with the amount of curvature depending on their position relative to the joint 4 and to the particular configuration of the punch 10. As in the previous embodiment, the flange adjacent the joint 4 will not be deformed and thus the integrity of the joint 4 will be preserved. However, the other portions which are annularly spaced around the flange from the joint 4 have an increasing expansion as illustrated.

Figure 5:
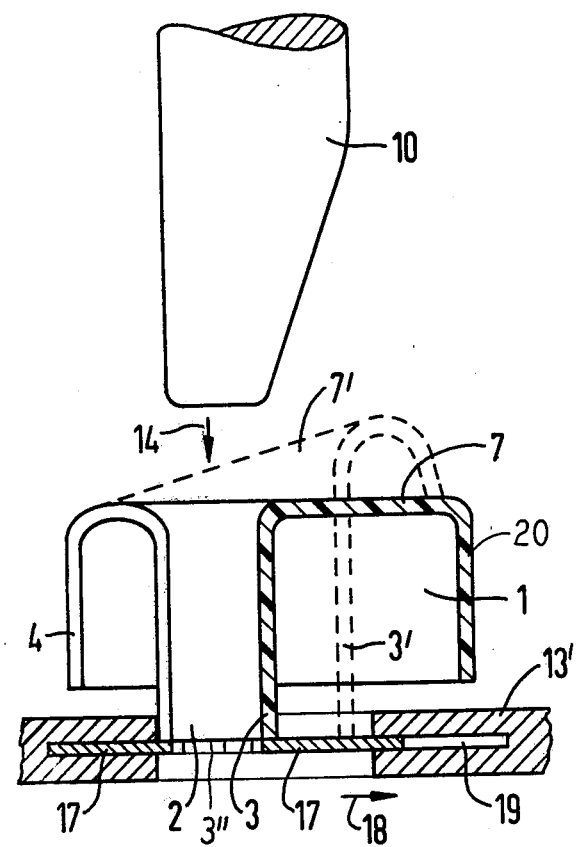
FIG. 5 is a cross-sectional view with portions in elevation for purposes of illustration of a third method for expanding flanged openings of a sleeve head in accordance with the present invention.

A third embodiment of the method for expanding a flange such as 3 to the expanded state 3' without creating axial stresses and displacements is illustrated in FIG. 5. In this arrangement, the free end 3" of the flange 3 is supported on an adjustable diaphragm 17 which acts as means for cooperating with the punch 10 to prevent axial material displacement.

The adjustable diaphragm 17 is advantageously designed as an iris diaphragm and serves as a limit stop for the free end or border 3" of the flange. During the expansion operation, the opening of the diaphragm 17 adapts itself to the instanteously given diameter of the entering punch 10 and to the diameter of the entering punch 10 and to the diameter of the correspondingly expanded flange 3'. This is schematically illustrated in FIG. 5 by the diaphragm 17 moving in slots 19 of a support 13' in a direction of arrow 18. Due to the expansion method of this type, the displacement of the flange 3 in an axial direction is prevented. It is also noted, that as the flange 3 moves to the expanded state 3', the wall or web 7 of the head 1 will be bulged into the folded condition 7'. As in the previous embodiments, the flange 3 has the separating joint. Therefore, the punch 10 has a one sided conical design to cause a non-uniform expansion of the flange 4 into the flange 3' and as in the previous embodiment, the portion of the punch 10 contactng the flange 3 adjacent the separating line 4 is substantially parallel to the axis of the flange while the remaining portion gradually increases in it amount of taper. If the flange 3 did not have the separating joint 4, then a punch with a uniform conical taper could be provided to create a uniform radial expansion of the flange.

In some of the above mentioned methods, heating of the material during the step of expanding the flange such as 3 to the expanded state 3' was mentioned. However, depending on the exact material, the expansion can be done at room temperature without requiring the elevated temperature. It is also noted that the amount of heating can be selected to obtain the desired softening prior to the expansion step.

Although various minor modifications may be suggested by those versed in the art, it should be understood that we wish to embody within the scope of the patent granted hereon, all such modifications as reasonably and properly come within the scope of our contribution to the art.

We claim:

1. In a sleeve head for closing an end of a cable sleeve, said sleeve head being a one piece member of a shrinkable material having a transverse wall with an integral outer wall portion and having at least one integral flange having an opening, each said flange forming cable inlet means for sealingly receiving a cable extending into the cable sleeve by shrinking from an expanded state toward a normal state and into sealing engagement on said cable when said cable is inserted therein, the improvements comprising each of said flanges in the expanded state being expanded only in a radial direction and having substantially no deformation and stresses along an axial direction of the opening, said transverse wall adjacent each of the expanded parts of said flanges being folded outwardly to compensate for the expansion of the size of said flanges so that during heat shrinking, each flange will shrink radially inward on a cable disposed therein with the folded wall moving to a substantially transverse planar condition without any axial shrinkage of the flanges to create disruptions on the seals.

2. In a sleeve head according to claim 1, said sleeve head including a sealable separating joint for each of the flanges, each joint including an axially extending slot in the flange extending through a portion of the transverse wall between the flange and outer wall portions and through the outer wall portion to enable inserting an uncut cable into the opening of said flange, said radial expansion of said expanded state of each flange being non-uniform with the expansion of the flange being substantially zero adjacent the separating joint and continuously increasing as the annular distance of the flange from the joint increase.

3. In a sleeve head according to claim 1, wherein said head has a single flange.

4. In a sleeve head according to claim 1, wherein said head has at least two flanges of different size openings in the expanded state.

5. In a sleeve head according to claim 4, which includes a sealable separating joint for each of the flanges, each joint including an axially extending slot in the flange extending through the portion of the transverse wall between the outer wall portion and flange and through the outer wall portion to enable inserting an uncut cable into the opening of said flange, each of said flanges in their expanded state having a non-uniform expansion starting with zero expansion and deformation adjacent said separating joint with the amount of expansion increasing as the annular distance from the separating joint increases and with the maximum amount occurring directly opposite said joint.

6. A method for forming a sleeve head for closing the ends of a cable sleeve, said sleeve head being a single member having a transverse wall with an outer wall portion and at least one flange with an opening through the wall member, each flange forming cable inlet means for sealingly receiving a cable extending into the cable sleeve by shrinking from an expanded state toward a normal state and into sealing engagement with the cable inserted therein, said method including the steps of providing a sleeve head having a transverse wall with an integral outer wall portion and each flange with an opening through the member, and expanding each of the openings of each of the flanges to an expanded state by radially spreading the flange apart with the transverse wall adjacent the expanded flange being bulged into a folded condition without any axial deformation of said flange and transverse wall so that during subsequent heat shrinking of the flange onto a cable, no axial displacement occurs as the flange radially contracts onto a cable.

7. A method according to claim 6, wherein the step of expanding comprises placing a plurality of lamellae in the opening of each flange, and moving the lamellae radially outward in the desired amount to obtain the desired radial expansion of the flange without an axial deformation of the flange.

8. A method according to claim 7, wherein the sleeve head includes a sealable separating joint for each of the flanges, each joint including an axially extending slot in the flange extending through a portion of the transverse wall between the outer wall portion and the flange and through the outer wall portion to enable inserting an uncut cable into the opening of the flange, said step of moving the lamellae radially outward to expand the flange to the expanded state includes not moving of the lamellae immediately adjacent the separating joint and moving the adjacent lamellae with increasing amounts as the annular distance of the lamellae from the joint increases so that a non-uniform radial expansion of the flange opening occurs.

9. A method according to claim 6, wherein the step of expanding each of the flanges includes using a conically designed punch and means coacting with said punch to prevent axial deformation of the flange as the punch is inserted in the opening of said flange.

10. A method according to claim 9, wherein the means for coacting includes means supporting the outer end of each flange as the punch is inserted from the opposite end adjacent the transverse wall.

11. A method according to claim 10, wherein the sleeve head includes a sealable separating joint for each of the flanges, each joint including an axially extending slot in the flange extending through a portion of the transverse wall between the outer wall portion and the flange and through the outer wall portion enable inserting an uncut cable into the opening of the flange, said step of expanding the opening of each of the flanges includes a non-uniform radial expanding with the amount of expansion adjacent the slot of each flange being substantially zero and the amount increasing as the annular distance from the slot increases, said step of nonuniformly expanding including utilizing a conical punch having a one side conical design and said means for supporting the free end of the flange being designed to expand as the punch moves therethrough with the portion supporting the flange immediately adjacent the slot being substantially stationary.

12. A method according to claim 9, wherein the means for coacting with the punch include means disposed between the interior of the flange and the punch to prevent frictional force transfer.

13. A method according to claim 12, in which the sleeve head has a sealable separating joint for each of the flanges, each joint including an axially extending slot in the flange extending through a portion of the transverse wall between the outer wall portion and the flange and through the outer wall portion to enable inserting an uncut cable into the opening of said flange, wherein said step of expanding each of the flanges includes a non-uniform radial expansion of the flange with the amount of expansion adjacent the slot being substantially zero and the amount of expansion of the flange increasing as the annular distance from the slot increased, and wherein the punch being inserted into the opening of the flange to cooperate with the means for preventing transfer of frictional forces to the flange wall is a one sided conical design so that the means for preventing transfer is not moved radially outward adjacent the slot and is increasingly moved outward as the annular distance on the flange from the slot increases.

14. A method according to claim 6, in which the head sleeve includes a sealable separating joint for each of the flanges, each joint including an axially extending slot in the flange extending through a portion of the transverse wall between the outer wall portion and the flange and through the outer wall portion to enable inserting an uncut cable into the opening of said flange, wherein said step of expanding the opening of each of the flanges to an expanded state includes non-uniformly expanding by spreading the flange parts non-uniformly with zero spreading forces applied to the flange adjacent said slot and the amount of spreading increasing as the annular distance from the slot increases.

* * * * *